Jan. 9, 1962 J. Z. DE LOREAN 3,016,269
CAST BRAKE DRUM
Filed Sept. 14, 1959 2 Sheets-Sheet 1

INVENTOR.
John Z. DeLorean
BY
His Attorney

United States Patent Office 3,016,269
Patented Jan. 9, 1962

3,016,269
CAST BRAKE DRUM
John Z. De Lorean, Birmingham, Mich., assignor to General Motors Corporation, Detroit, Mich., a corporation of Delaware
Filed Sept. 14, 1959, Ser. No. 839,860
Claims priority, application Germany Sept. 23, 1958
3 Claims. (Cl. 301—6)

This invention relates to a vehicle drum brake and more particularly to an integral cast wheel and drum.

In the conventional vehicle drum brake a cast iron drum is most commonly used. The cast iron drum, although having good frictional qualities and relatively high strength, has very poor heat conducting qualities. With the increased speed and weight of the present-day vehicle, the braking capacity must also be increased accordingly. With this in mind, it is advantageous to construct a lightweight wheel and brake drum having good frictional qualities combined with strength, as well as providing good conduction of heat for radiation from the drum. Accordingly, this invention is intended to provide these advantages.

It is an object of this invention to provide an integral cast vehicle wheel and brake drum.

It is another object of this invention to provide a lightweight integral wheel and brake drum having good frictional qualities with resistance to fracture in combination with good heat conduction and heat radiating qualities.

It is a further object of this invention to provide a member constructed of a tough metal to provide reinforcing means within a cast metal which has good heat conducting and radiating qualities. It is a further object that this integral wheel and drum should provide hard mounting surfaces for the bolts, rivets, and pilot means in mounting the wheel and rim.

The objects of this invention are accomplished by means of placing a member constructed of a sheet metal stamping having high tensile strength in a cast metal having high heat conducting and radiating qualities to form an integral wheel and drum. The cast metal may be of an aluminum having a high silicon to provide good frictional qualities. The outer periphery of the cast portion of the drum and wheel is also provided with a plurality of radiating fins to dissipate the heat to the passing air stream when the vehicle wheel is in motion.

Further objects and advantages of the present invention will be apparent from the following description, reference being had to the accompanying drawings wherein preferred embodiments of the present invention are clearly shown.

Figure 1:
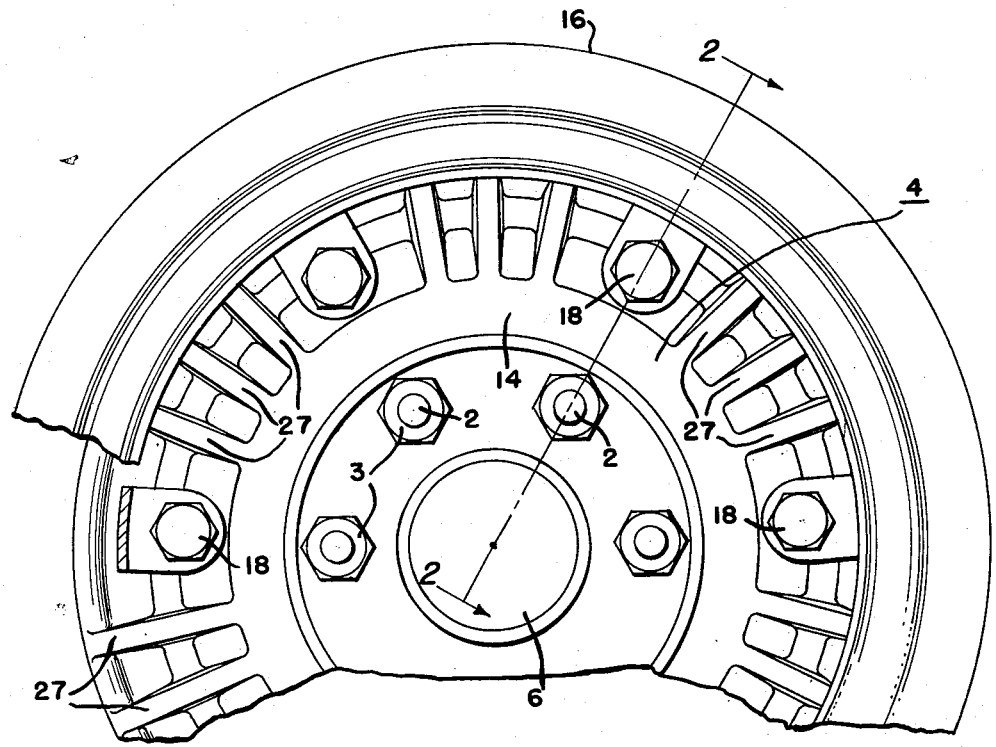
FIGURE 1 is a side elevational view of the integral wheel and drum taken from the outboard side of the wheel.
Figure 3:
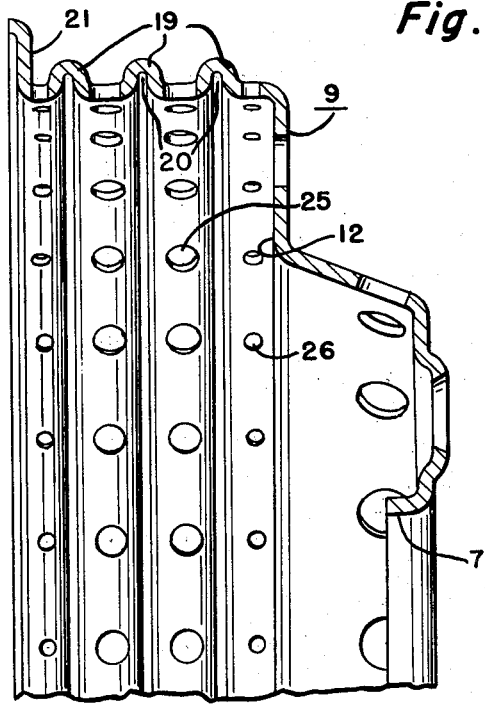
FIGURE 3 is a cross-sectional view of the sheet metal reinforcing member which shows the perforations for conducting of heat.
Figure 2:
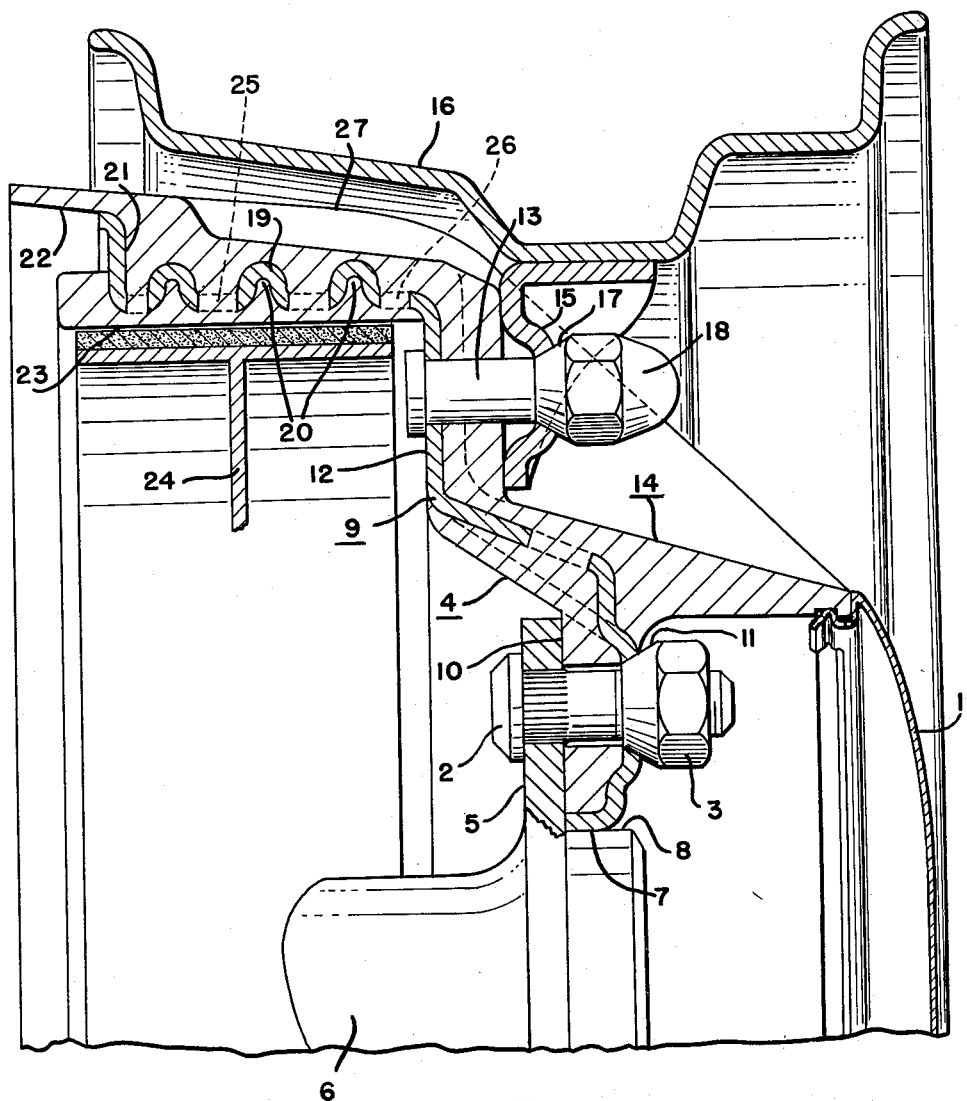
FIGURE 2 is a cross-sectional view taken from line 2—2 of FIGURE 1.

FIGURE 1 illustrates a wheel and drum shown from the outboard side of the vehicle. The hub cap 1 is removed to show the location of the wheel bolts 2 and the plurality of nuts 3. The plurality of bolts 2 and nuts 3 provide a fastening means for the integral wheel and drum 4 on the wheel flange 5 of the drive shaft 6. The inner periphery of the integral wheel 4 is formed by a reinforcing member 7 constructed of a metal having a high tensile strength. This metal may be formed with a close tolerance on the inner periphery of the wheel to provide a pilot for the wheel on the cylindrical portion 8 of the drive shaft 6. The radially inner portion of the stamping 9 extends radially outward and receives the bolts 2. The inboard side of the wheel 4 is formed by the cast portion having a surface 10. The outboard side is formed by the stamping 9 which provides a hard surface for the tightening of the cone-shaped portion 11 of the nuts 3. Radially outward on the wheel the stamping 9 forms a radial planar surface 12. This planar surface 12 receives a plurality of rim bolts 13 which extend through the stamping 9 and the casting 14. This construction provides a hard surface for mounting of the plurality of bolts 13.

A second hard surface is also provided in the lug 15 which extends radially inward from the rim 16. The lug 15 is provided with a cone-shaped recess for receiving the mating surface 17 of the plurality of nuts 18. This provides a centering means with a hardened surface in fastening the bolts 13 and nuts 18.

The stamping 9 extends axially to form the brake drum reinforcing portion within the casting 14. The drum portion of the stamping 9 has a plurality of reinforcing ridges 19 forming depressions 20. This type of a structure forms a rigid drum which resists fracture or deformation as the brake shoes engage in the periphery of the drum.

The axially outboard side of the stamping 9 forms a radial flange 21 to provide a sealing groove 22. The sealing groove 22 is also formed by an extension of the casting 14.

The casting 14 is placed on the stamping 9 to form the inner periphery of the drum. The inner periphery of the drum forms a cylindrical surface 23 for engaging brake shoe 24. The metal for the casting is preferably formed from a high silicon aluminum to provide a metal having a good friction characteristic for the vehicle brake drum. The aluminum metal provides a very high rate of conduction of heat dissipated on the inner periphery of the brake drum as the brakes are actuated. The stamping 9 is provided with a plurality of perforations 25 and 26 which operate to form a firm seating of the casting 14 on the stamping 9. These perforations also aid in the conducting of the heat from the inner periphery of the drum formed by the cylindrical surfaces 23 to fins 27 on the outer periphery of the drum.

The outer periphery of the cast 14 forms a plurality of radiating fins 27 to radiate heat to the air stream as the vehicle wheel rotates. The radiating fins 27 extend from the axially inboard side to the axially outboard side to the combination wheel and brake drum. This provides the maximum radiating surface on the outer periphery of the drum and wheel. The fins are placed between the rim and the drum section with an opening extending between these two members to permit passage of air between the rim and the drum.

The stamping 9 is preferably formed of a tough material such as steel, or a nickel chrome aluminum element. This type of a stamping has a high resistance to fracture and retains a relatively constant cylindrical shape about the inner periphery of the drum as the vehicle brakes are actuated. The aluminum nickel chrome alloy has the added advantage of having a coefficient of expansion of approximately the same as that of the cast portion of high silicon aluminum forming the inner periphery of the drum and the radiating fins.

This integral wheel and drum operates in the following described manner: The heat is dissipated by engagement of the brake shoe 24 with the inner periphery of the drum on the cylindrical surface 23. The heat on the inner periphery of the drum is conducted radially outward through the stamping 9 to the radiating fin 27. The reinforcing stamping 9 provides a rigid structure which deforms but slightly as the brake shoes are engaging the inner periphery of the drum. The heat is conducted to the fins 27 which extends from the inboard to the outboard side of the vehicle wheel. These fins provide a large area for radiating heat dissipated within the drum. As the vehicle wheels rotate, the fins 27 pass through the air stream radiating heat to the air. The fins also create a slight movement from the radially outboard to the radially inboard side of the vehicle wheel as the device operates as a centrifugal pump. This causes an additional movement of air across the fins through the wheel structure, the metals being constructed so that the heat is conducted radially to the fins and thereby radiated to the atmosphere. This structure provides a lightweight wheel and drum which may be readily adapted to a small size wheel. With the decrease in the size of the wheel and the capacity for added braking capacity, this wheel provides a means for readily removing heat from the braking structure. The structure also provides for an integral wheel and drum section whereby the rim section is demountable with ease.

The integral wheel and drum may be mounted on the pilot very readily and the nuts 11 engage a hardened surface to form an alignment means and a convenient means for mounting of the wheels. It is also noted that the rim bolts and nuts 17 also are provided with a hardened surface for assembling the rim 16 to the integral wheel and drum section 4. The advantages of a conventional vehicle wheel are retained while providing a lightweight wheel with a means for radiating a considerably greater amount of heat than that of the conventional wheel and brake drum.

While the embodiments of the present invention as herein disclosed, constitute preferred forms, it is to be understood that other forms might be adopted.

What is claimed is as follows:

1. A rim supporting vehicle wheel structure and brake drum forming an integral unit comprising in combination, a metal stamping, an aluminum casting cast integral with said stamping, a brake drum formed in said integral unit, a radial drum supporting wall connected to said drum and formed by said casting and said stamping, a plurality of holes angularly spaced in said radial wall adjacent to said drum adapted for receiving a plurality of bolts for supporting a wheel rim, a central opening in said radial wall adapted for reception on a hub, a plurality of bolt openings angularly spaced about said central opening adapted for receiving a plurality of bolts to fasten to said hub, a plurality of annular ridges formed in the drum section of said stamping to provide reinforcement and resistence to fracture, a plurality of perforations in said drum section of said stamping receiving a portion of the casting and interlocking the portion of the casting on the radial inner and radial outer sides of the drum section in said stamping, a plurality of radiating fins on the outer periphery of the casting to radiate heat dissipated within said drum of said unit, said unit thereby providing means for reinforcing a rim supporting wheel structure and providing a means for transfer of heat from the drum to the fins for cooling of said wheel structure.

2. A rim supporting vehicle wheel structure and brake drum comprising in combination, a reinforcing member, a drum section formed on said reinforcing member, a plurality of annular reinforcing ridges formed on said drum section, a plurality of perforations through said drum section of said reinforcing member, a drum supporting wall on said reinforcing member, a cast member cast integral with said reinforcing member, a cylindrical opening extending into the cast portion of said cast member forming a drum section adapted for engaging brake shoe means, a plurality of fins formed on the outer periphery of said cast member to provide radiation of heat from said drum section, an interlocking portion of said cast member extending through said plurality of perforations on said drum section to provide rapid transfer of heat from the inner periphery of said drum section of said cast member to the plurality of radial fins, a plurality of openings angularly spaced in said drum supporting wall adjacent to the drum adapted for receiving fastening means for supporting a wheel rim, a plurality of holes spaced radially inward from said openings in said drum supporting wall adapted for reception of fastening means engaging a hub means, a seating portion on said plurality of openings and holes adapted for engaging said fastening means thereby providing resistance to wear and a firm support for said radial wall on said hub.

3. A vehicle rim supporting wheel structure and brake drum formed integral comprising in combination, a reinforcing member, a lightweight cast member of good thermal conduitivity cast integral with said reinforcing member enclosing the major portion of said reinforcing member, a drum portion formed on said reinforcing member and said cast member forming a central opening adapted for engaging brake shoe means, a plurality of reinforcing ridges formed on said drum portion of said reinforcing member, a plurality of perforations extending radially through said drum portion of said reinforcing member, a drum and rim supporting wall connected to said drum section, a plurality of holes angularly spaced on said drum supporting wall adjacent the drum section, a bearing surface formed on said plurality of holes to resist wear of the fastening means adapted for supporting a wheel rim, a plurality of openings spaced radially inward from said plurality of holes in said radial wall, a seating portion formed in said plurality of openings to resist wear by the fastening means adapted for fastening to a wheel hub, a plurality of radiating fins formed on the outer periphery of said drum portion and joining said drum supporting wall with said drum portion, an interlocking portion extending through said plurality of perforations in said drum section of said reinforcing member thereby providing rapid transfer of heat dissipated in the drum portion to the plurality of radially fins on the outer periphery of said cast member.

References Cited in the file of this patent

UNITED STATES PATENTS

| | | |
|---|---|---|
| 995,013 | Jones | June 13, 1911 |
| 1,394,402 | Birkigt | Oct. 18, 1921 |
| 1,843,620 | Norton | Feb. 2, 1932 |
| 1,927,251 | Winters | Sept. 19, 1933 |
| 1,951,623 | Miller | Mar. 20, 1934 |
| 1,993,430 | Bell | Mar. 5, 1935 |
| 2,274,503 | Reid | Feb. 24, 1942 |
| 2,439,881 | Ash | Apr. 20, 1948 |